(12) United States Patent
Suga et al.

(10) Patent No.: US 7,984,775 B2
(45) Date of Patent: Jul. 26, 2011

(54) LEGGED ROBOT

(75) Inventors: Keisuke Suga, Aichi (JP); Masaaki Yamaoka, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 241 days.

(21) Appl. No.: 12/280,361

(22) PCT Filed: Feb. 20, 2007

(86) PCT No.: PCT/JP2007/053457
§ 371 (c)(1),
(2), (4) Date: Aug. 22, 2008

(87) PCT Pub. No.: WO2007/105463
PCT Pub. Date: Sep. 20, 2007

(65) Prior Publication Data
US 2009/0009124 A1 Jan. 8, 2009

(30) Foreign Application Priority Data
Mar. 1, 2006 (JP) .................................. 2006-055319

(51) Int. Cl.
*B25J 19/00* (2006.01)
(52) U.S. Cl. ............................. 180/8.1; 180/8.2; 180/8.3
(58) Field of Classification Search .................. 180/8.1, 180/8.2, 8.3, 8.5
See application file for complete search history.

(56) References Cited

U.S. PATENT DOCUMENTS

| | | | | | |
|---|---|---|---|---|---|
| 912,108 | A | * | 2/1909 | Gaskill | 180/8.6 |
| 1,511,928 | A | * | 10/1924 | Zboril | 180/8.7 |
| 3,484,988 | A | * | 12/1969 | Robbins | 446/355 |
| 4,629,440 | A | * | 12/1986 | McKittrick et al. | 446/356 |

(Continued)

FOREIGN PATENT DOCUMENTS

DE 10032640 1/2002

(Continued)

OTHER PUBLICATIONS

Office Action for Chinese Patent Application No. 2007800023552, dated Dec. 4, 2009.

(Continued)

*Primary Examiner* — Joanne Silbermann
*Assistant Examiner* — Michael R Stabley
(74) *Attorney, Agent, or Firm* — Finnegan, Henderson, Farabow, Garrett & Dunner, LLP

(57) ABSTRACT

A legged robot that can ensure a large step length while keeping the height of a body trunk at a low position without increasing a moment that is generated due to the gravitational force acting on the trunk and acting on roll joints of legs when standing on one leg is realized. In the legged robot, a pair of legs is connected so as to be able to rotate around a pitch axis (Y-axis) at lateral surfaces of a trunk. Thereby, it is possible to make the height H1 high while keeping the height of the trunk low. It is possible to ensure a large step length while keeping the height of the trunk at a low position. Legs have a structure in which roll joints are positioned below a bottom surface. Thereby, the length L1 in the pitch axis direction between the rotation axis C1 of these joints and the center of mass G of the trunk is limited. The moment acting on the roll joints of the grounding leg when standing on one leg is not increased.

7 Claims, 7 Drawing Sheets

U.S. PATENT DOCUMENTS

| | | | | |
|---|---|---|---|---|
| 4,834,200 | A | * | 5/1989 | Kajita .............................. 180/8.1 |
| 5,159,988 | A | * | 11/1992 | Gomi et al. ..................... 180/8.6 |
| 5,343,397 | A | * | 8/1994 | Yoshino et al. .................. 701/23 |
| 6,089,950 | A | * | 7/2000 | Lee et al. ....................... 446/376 |
| 6,238,264 | B1 | * | 5/2001 | Kazami et al. ................ 446/356 |
| 6,243,623 | B1 | * | 6/2001 | Takenaka et al. ............. 700/245 |
| 6,462,498 | B1 | * | 10/2002 | Filo .......................... 318/568.12 |
| 6,505,096 | B2 | * | 1/2003 | Takenaka et al. ............. 700/245 |
| 6,564,888 | B1 | * | 5/2003 | Gomi et al. ..................... 180/8.6 |
| 6,580,969 | B1 | * | 6/2003 | Ishida et al. ................. 700/245 |
| 7,053,577 | B2 | * | 5/2006 | Nagasaka ................. 318/568.12 |
| 7,240,747 | B2 | * | 7/2007 | Miyazaki et al. ............. 180/8.6 |
| 7,289,884 | B1 | * | 10/2007 | Takahashi et al. ............ 700/245 |
| 2002/0022907 | A1 | * | 2/2002 | Takenaka et al. ............. 700/245 |
| 2009/0009124 | A1 | | 1/2009 | Suga et al. |

FOREIGN PATENT DOCUMENTS

| | | | |
|---|---|---|---|
| JP | 61-143266 | | 6/1986 |
| JP | 62-149568 | | 7/1987 |
| JP | 7-256579 | | 10/1995 |
| JP | 11-500331 | | 1/1999 |
| JP | 2000-355290 | | 12/2000 |
| JP | 2002-160182 | | 6/2002 |
| JP | 2003-80476 | | 3/2003 |
| JP | 2003-266339 | | 9/2003 |
| JP | 2004-105553 | | 4/2004 |
| JP | 2005-52897 | | 3/2005 |
| JP | 2005-161441 | * | 6/2005 |
| JP | 2005-186650 | | 7/2005 |
| JP | 2005-297087 | | 10/2005 |
| JP | 2007-185734 | * | 7/2007 |
| JP | 2007-229872 | | 9/2007 |
| WO | WO 96/23478 | | 8/1996 |

OTHER PUBLICATIONS

Extended Search Report for EP Application No. 07706575.3, dated Jan. 13, 2010.
Notification of Reasons for Rejection for Japanese Appl. No. 2006-207471 dated Apr. 13, 2010.
Japanese Office Action dated Dec. 9, 2008.
Extended European Search Report dated Feb. 19, 2010, for EP Appl. No. 07791469.5.
Replacement Supplemental EP Search Report dated Feb. 23, 2010 for EP Appl. No. 07706575.3.
Extended European Search Report dated Jul. 30, 2010, for EP Appl. No. 10005405.5.

* cited by examiner

US 7,984,775 B2

LEGGED ROBOT

CROSS-REFERENCE TO RELATED APPLICATION

This application is a national phase application of International Application No. PCT/JP2007/053457, filed Feb. 20, 2007, and claims priority to Japanese Patent Application No. 2006-055319, filed on Mar. 1, 2006, the contents of both of which are hereby incorporated by reference into this specification.

TECHNICAL FIELD

The present invention relates to a legged robot. In particular, the present invention relates to a legged robot that can walk with long strides while keeping the height of the body trunk at a low position, and that does not increase the load applied to one of the legs when standing only with the one of the legs.

In the present specification, the roll direction, the pitch direction, and the yaw direction, which are mutually perpendicular, are defined as follows. In a perpendicular coordinate system fixed to the body trunk of the robot, the direction that extends forward from the body trunk is defined as the roll direction. The direction that extends vertically upward from the body trunk is defined as the yaw direction. The direction that extends laterally from the body trunk is defined as the pitch direction. In addition, a joint that has a rotation axis (roll axis) that extends along the roll direction is referred to as a roll joint, a joint that has a rotation axis (pitch axis) that extends along the pitch direction is referred to as a pitch joint, and a joint that has a rotation axis (yaw axis) that extends along the yaw direction is referred to as a yaw joint.

BACKGROUND ART

A legged robot that is provided with a body trunk (the "body trunk" may simply be referred to as the "trunk" hereinafter) and a pair of legs that are connected to the trunk so as to be able to rotate is being developed. Each of the legs is provided with a plurality of links and joints that connect the adjacent links together so as to be able to rotate. Actuators such as motors, for example, are provided in the leg connecting portions, which connect the trunk and the legs so as to be able to rotate, and in the joints of the legs, and the legged robot walks by appropriately controlling the actuators. Generally, the leg connecting portion has a rotation axis at which the leg is rotated around the pitch axis with respect to the trunk. When the entire leg rotates around the pitch axis with respect to the trunk, the foot of the leg moves back and forth with respect to the trunk. It is possible to realize a long step length that takes maximum advantage of the entire lengths of the legs by rotating each of the legs alternately around the pitch axis with respect to the trunk.

Such a legged robot is disclosed in Japanese Patent Application Publication No. 2005-186650 (Patent Document 1). The legged robot disclosed in Patent Document 1 is provided with a trunk in which a person can ride, and a pair of legs. Each of the legs is connected at the bottom of the trunk so as to be able to rotate with respect to the trunk. Each of the legs is connected so as to be able to rotate around the pitch axis with respect to the trunk.

SUMMARY OF THE INVENTION

A legged robot that can walk with long step lengths is preferable. On the one hand, in order to walk stably, the position of the trunk of the legged robot is better to be kept low. In order to make the step length larger, the entire length of the leg may be elongated. In the technology disclosed in Patent Document 1, the pair of legs is connected to the bottom of the trunk. In such a configuration, when the entire length of the legs is elongated, the height of the trunk increases.

In order to make the entire length of the leg long while maintaining the height of the trunk at a low position, connecting the legs to the lateral surfaces of the trunk may be considered. However, if the legs are connected to the lateral surfaces of the trunk, the distance in the pitch direction between the center of mass of the trunk and the legs becomes large. In the case in which the legged robot is standing on one leg while walking, the moment that acts around the roll axis in the one leg which is in contact with the ground due to the gravitational force that acts on the mass of the trunk becomes large in proportion to the distance in the pitch direction between the center of mass of the trunk and the leg which is in contact with the ground. Specifically, when the legs are connected to the lateral surfaces of the trunk, the moment that acts around the roll axis in the leg which is in contact with the ground becomes large. When the moment that acts around the roll axis in the leg becomes large, the actuators of the roll joints possessed by the leg are burdened with further load that counteract the moment. This may give rise to making the actuators of the roll joints for maintaining or changing the relative rotation angle between adjacent links around the roll axis to be enlarged.

The problem described above will be explained with reference to FIG. 7. FIG. 7 is a front view of a conventional legged robot 700. Note that in FIG. 7, the side to the right of the center line Q (side QL) shows one type of structure of a conventional robot, and the side to the left of the center line Q (side QR) shows another type of structure of a conventional robot. The QL side to the left of the center line Q that is shown in FIG. 7 illustrates the structure in which a leg 720R is connected to a trunk 710 at a bottom surface 714, as is disclosed in Patent Document 1. The QR side to the right of the center line Q illustrates a structure in which a leg 720L is connected to the trunk 710 at a lateral surface 712L. Circles 738R, 738L, 744R, and 744L that are drawn on the legs 720R and 720L represent the roll joints. The diamond having an inscribed straight line and drawn on the legs 720R and 720L represent the yaw joints and the pitch joints.

As is clear from FIG. 7, height H1 (that is, the length of the entire leg) from a contact surface 900 of the leg 720L that is connected to the trunk 710 at the lateral surface 712L can be made higher than height H2 of the bottom surface 714. By connecting the leg to the trunk at the lateral surface 712L, it is possible to ensure the entire length of the leg to be long while keeping the height of the trunk in a vertical direction at a low position. That is, it is possible to ensure a large step length while keeping the height of the trunk at a low position.

Furthermore, in the case of the leg 720R that is connected to the trunk 710 at the bottom surface 714, the distance in the pitch axis (Y axis) direction between the rotation axis C4 of the roll joint 738R and the center of mass G of the trunk is L3. On the other hand, in the case where the leg 720L is connected to the trunk 710 at the lateral surface 712L, the distance in the pitch axis direction between the rotation axis C5 of the roll joint 738L and the center of mass G of the trunk is L2. As is clear from FIG. 7, when the leg is connected to the lateral surface 712L, the length in the pitch axis direction between the rotation axis of the roll joint and the center of mass of the trunk becomes longer. Thus, a moment T5 that acts on the roll joint 738L due to the gravitational force FG that is applied at the center of mass G of the trunk becomes larger. The load on the actuators (not illustrated) possessed by the roll joint 738L increases in order to resist this moment T5. Such increase in burden forces the actuator that is possessed by the roll joint 738L and the roll joint 738L itself to be made large. Consequently, the roll joint 744L must also be made large.

Preferably, the walking robot should weigh light as much as possible. A legged robot in which a large step length can be ensured while maintaining the height of the trunk at a low position and in which the load applied to the roll joints of the legs when standing on one leg is not increased is desired.

In order to make the moments acting around the roll axes of the roll joints of the leg that is in contact with the ground to be small while the legged robot is standing on that one leg, the distance in the pitch direction between the center of mass of the trunk and the roll joints should be made short. Meanwhile, in order to ensure a large step length while maintaining the height of the trunk low, the legs should be connected to the trunk at the lateral surface.

If both of the conditions described above can be satisfied, a legged robot in which a large step length can be ensured while keeping the height of the trunk at a low position and suppressing increase of the load applied to the roll joint of the leg which is in contact with the ground while standing by one leg can be realized.

The legged robot according to the present invention comprises a body trunk and a pair of legs. Each of the legs is connected to each side of lateral surface of the body trunk via a leg connecting portion that has a pitch axis. Each of the legs rotates around the pitch axis with respect to the body trunk by the leg connecting portion. Each of the legs has the following shape when viewed from the roll axis direction. Specifically, each of the legs extends along the lateral surface of the body trunk, curves along under the body trunk, and then curves downward. In addition, each of the legs has a roll joint that is disposed below the body trunk and has a roll axis. Note that the expression "when viewed from the roll axis direction" is, in other words, equivalent to the expression "in a plane parallel to the plane that includes the yaw axis and the pitch axis."

According to the configuration described above, each of the legs is connected to the trunk at each of the lateral surfaces of the trunk. Thereby, it is possible to make the height of the leg from the contact surface high while keeping the height of the trunk at a low position. Specifically, the entire length of each leg can be made long. The foot of the leg swings back and forth (along the roll axis direction) with respect to the trunk with the pivot at the rotation axis of the leg connecting portion. It is possible to ensure a large step length while keeping the height of the trunk at a low position.

According to the configuration described above, the roll joints of the legs are disposed below the trunk when viewing the leg from the roll direction. Thus, it is possible to make the length in the pitch direction between the roll joint possessed by each of the legs and the center of mass of the trunk to be short. Even if the leg is connected to the trunk at the lateral surface of the trunk, and standing on one leg, the moment due to gravitational force applied to the trunk that acts on the roll joint on the leg which is in contact with the ground does not increase. The load on the actuator of the roll joint does not increase. Even though the legs are connected to the sides of the trunk at the lateral surface of the trunk, the actuators of the roll joints, and in addition the roll joints themselves, do not have to be made large.

In the legged robot of the present invention, each of the legs may have a shape that, when viewed from the roll axis direction, extends along the lateral surface of the trunk from the leg connecting portion, curves along the surface of the body trunk that extends from the lateral surface to a bottom surface, extends along the bottom surface, and then curves downward. The legs may curve vertically or gradually as in an arc-like shape. There are various configurations for the connecting structure of the links and joints of the legs that realize the shape described above. The connecting structure between the links and the joints of the legs can be realized, for example, as follows. In one configuration, each of the legs includes a first link that extends along the lateral surface of the body trunk, a second link that extends along the bottom surface of the body trunk, and a third link that extends downward vertically. One end of the first link is rotatably connected to the lateral surface of the trunk via a leg connecting portion so as to be able to rotate with respect to the body trunk. The other end of the first link is connected to one end of the second link via a joint (pitch joint) that has a rotation axis extending along the pitch direction such that the second link is able to rotate. The other end of the second link is connected to one end of the third link by a roll joint that is positioned below the trunk so as to be able to rotate.

In an alternative configuration of the connecting structure of the links and the joints of the legs, each of the legs may include a curved link that extends along the lateral surface of the body trunk and then curves toward a direction that is along the bottom surface of the body trunk, and a lower link that extends downward beneath the body trunk. One end of the curved link is connected to the lateral surface of the trunk via the leg connecting portion so as to be able to rotate with respect to the body trunk. The other end of the curved link is connected to one end of the lower link via a roll joint that is disposed below the body trunk such that the lower link is able to rotate.

In both of these configurations, when viewed from the roll axis direction, each of the legs has a shape that extends along the lateral surface of the body trunk from the leg connecting portion, curves to extend along the bottom surface of the body trunk at an intermediate point of the leg, and then curves downward below the body trunk.

It is possible to realize a legged robot whose legs are connected to the body trunk at the lateral surface of the body trunk in a rotatable manner, and in which, when viewed from the roll axis direction, the roll joints are positioned below the body trunk.

Any number of the joints may be possessed by each of the legs. The number of links is determined by the number of joints. Depending on the number of joints and links, various configurations may be considered for the connecting structure between the links and the joints that configure the legs overall. No matter what kind of configuration the links and joints that configure the legs overall may possess, the effects that have been explained above may be achieved so long as each of the legs has a shape that extends along the lateral surface of the trunk from the leg connecting portion, curves to extend along the bottom surface of the trunk, and then curves downward beneath the body trunk when viewed from the roll axis direction, and, the roll joints are disposed below the trunk when viewed from the roll axis direction.

The trunk of the legged robot according to the present invention is preferably provided with a curved bottom surface. More specifically, the bottom surface of the trunk preferably curves, in a cross-section that intersects the pitch direction, with the center of the curve to be located at the rotation axis of the leg connecting portion. Here, the second link preferably has a roller. Due to such a curved bottom surface and roller, the second link moves along the bottom surface while the roller is in contact with the bottom surface, accompanying the rotation of the leg with respect to the trunk. The roller that rotates while in contact with the curved bottom surface may be disposed at a joint that is connected to the second link moving along the bottom surface and moves along the bottom surface along with the second link. This is because the joint that connects to the second link and moves along the bottom surface along with the second link can be considered to be a part of the second link. In addition, the bottom surface of the trunk may be curved at least at the part where the roller moves. Note that the second link can move along the bottom surface of the trunk by being connected to the other end of the first link that rotates with a pivot at the axis of rotation of the leg connecting portion.

According to the structure described above, the roller that is possessed by each of the legs is always in contact with the bottom surface of the trunk. The second link moves along the curved bottom surface. When the leg rotates around the rotation axis of the leg connecting portion, the second link moves along the bottom surface. Here, the roller rolls on and moves with respect to the bottom surface while in contact with the bottom surface. Hence, the second link can move smoothly along the curved bottom surface.

According to the structure described above, the trunk is constantly supported by the legs at two points: at the leg connecting portions and at the rollers that are in contact with the bottom surface. While standing by one leg, the leg that is in contact with the ground can support the trunk at the two points. The load and the moment acting on the leg connecting portion can be reduced due to the roller being in contact with the bottom surface of the trunk.

It is possible to realize a legged robot that, in addition to preventing an increase in the moment that generate due to gravitational force that acts on the trunk and acts on the roll joint of the leg that is in contact with the ground when standing by one leg, can reduce the load and the moment acting on the leg connecting portion of the leg that is in contact with the ground, and can ensure a large step length while keeping the height of the trunk at a low position.

In a case where each of the legs has a fourth curved link that extends along a lateral surface of the trunk and then curves to a direction along the bottom surface, the legged robot may further have the following features. Specifically, the body trunk may have a curved bottom surface. The bottom surface of the trunk may curve, in a cross-section that intersects the pitch direction, with the center of the curve at the rotation axis of the leg connecting portions. In this context, the curved link preferably includes a roller. Due to such a curved bottom surface and roller, the curved link moves along the bottom surface while the roller is in contact with the bottom surface, accompanying the rotation of the leg overall with respect to the trunk. Note that one end of the curved link is connected at the lateral surface of the trunk so as to be able to rotate around the pitch axis, and thereby the other end of the curved link, which is positioned below the trunk, can move along the curved bottom surface.

Due to having the features described above, it is possible to realize a legged robot that, in addition to preventing an increase in the moment that is generated due to the gravitational force that acts on the trunk and acts on the roll joint of the leg that is in contact with the ground while standing only on one leg, can reduce the load and the moment acting on the leg connecting portion of the grounding leg, and can ensure a large step length while keeping the height of the trunk at a low position.

Preferably each of the legs is connected to the trunk vertically above the center of mass of the trunk when viewed from the lateral direction (the pitch direction). Due to such a configuration, it is possible to put the attitude of the trunk around the rotation axis of the leg connecting portion to an auto-stabilizing state. Specifically, even in a state in which the trunk and the legs can freely rotate, due to the gravitational force, the center of mass of the trunk is positioned vertically below the rotation axis of the leg connecting portions. Even in a state in which the trunk and legs can rotate freely, the trunk does not overturn. It is possible to stabilize the attitude of the trunk around the rotation axis of the leg connecting portions.

Preferably, the trunk has a seat, and the seat base of the seat is positioned vertically below the connecting portions (leg connecting portions) when viewed from the lateral direction (the pitch direction). Generally, it is known that when a person is seated, the position of the center of mass of the person is located in the vicinity of the hip. Therefore, it is possible to keep the position of the center of mass of a seated rider below the rotation axis of the leg connecting portions by positioning the seat base of the seat to be below the leg connecting portions. When taken into consideration along with the fact that the rotation axis of the leg connecting portions is positioned above the position of the center of mass of the trunk, it is possible to make the position of the center of mass of the trunk and the rider to be below the rotation axis of the leg connecting portions. It is possible to stabilize the attitude of the trunk in which a rider is riding.

According to the present invention, a legged robot that can walk with long strides while maintaining the height of the trunk at a low position, and suppress an increase of the load acted upon the roll joint of the grounding leg while standing with only one grounding leg is achieved.

BRIEF DESCRIPTION OF THE DRAWINGS

The invention may be better understood by referring to the following drawings. The structural elements of the drawings are not necessarily shown at a constant scale; rather an emphasis in parts is used in order to clarify the principle of the present invention. In the figures, reference numerals show corresponding portions that are common among the different drawings.

DETAILED DESCRIPTION OF THE INVENTION

First Embodiment

Figure 1:
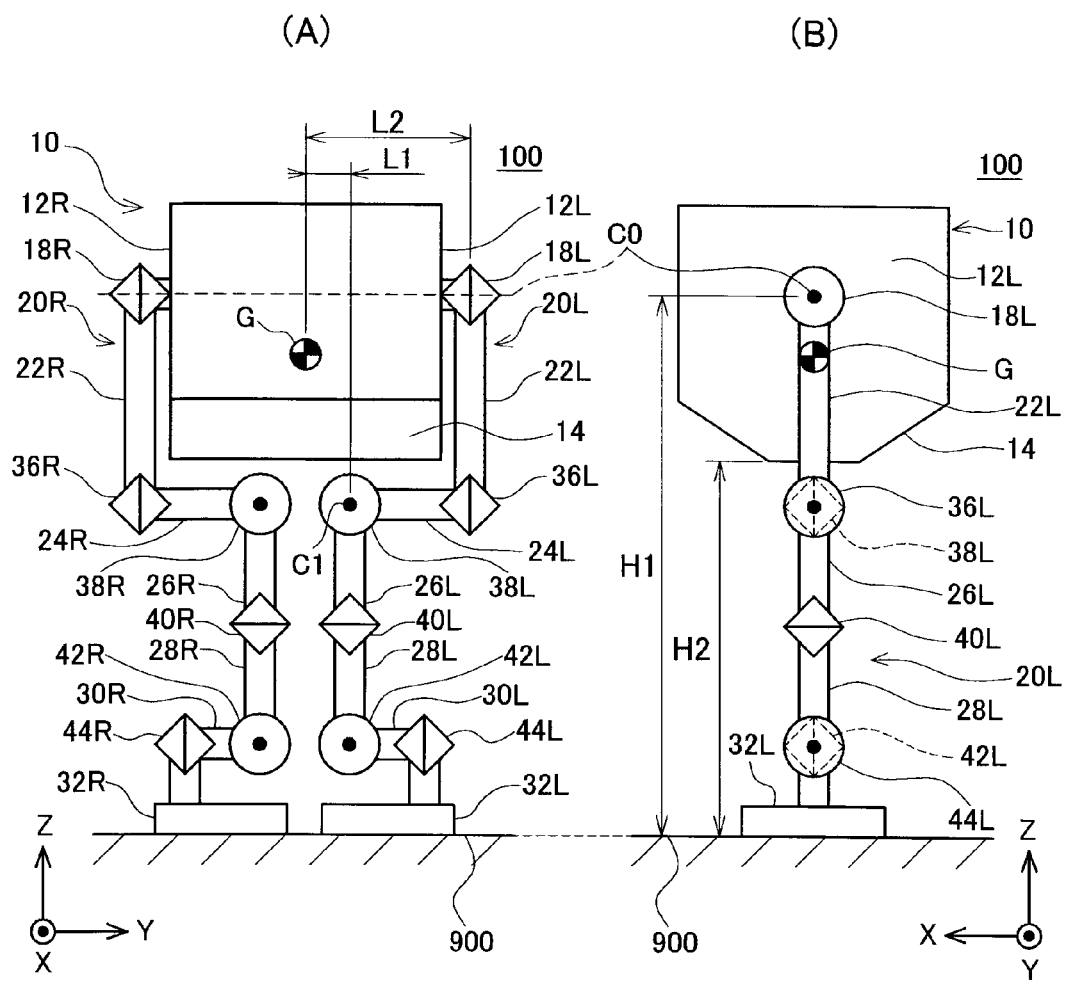
FIG. 1(A) shows a front view and FIG. 1(B) shows a side view of a legged robot of a first embodiment.
Figure 2:
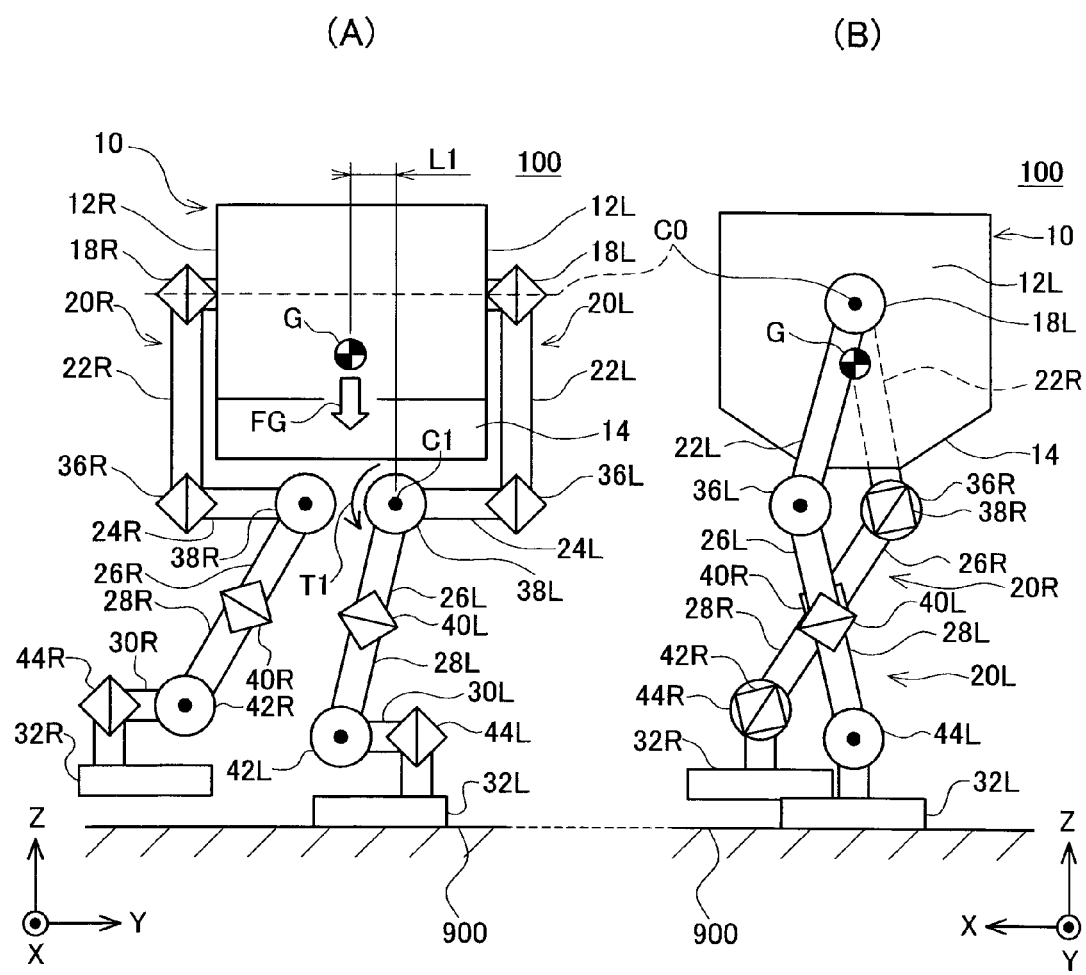
FIG. 2(A) shows a front view and FIG. 2(B) shows a side view of a legged robot of a first embodiment at a state in which the legged robot is standing on one leg.

The legged robot according to the first embodiment of the present invention will be explained with reference to FIGS. 1(A) to 2(B). FIG. 1(A) is a front view of the legged robot 100. FIG. 1(B) is a side view of the legged robot 100. The legged robot 100 includes a trunk 10 and a pair of legs 20L and 20R. Note that in FIG. 1(B), the illustrations of parts that are hidden by the parts that are positioned to the front side of the figure are omitted except for the parts shown by the reference numerals 38L and 42L.

First, the coordinate system will be explained. In FIG. 1(A) and FIG. 1(B), an XYZ coordinate system defines a right-handed orthogonal coordinate system. This XYZ coordinate system has an origin that is fixed to the trunk 10 of the legged robot 100. The X-axis extends forward from the trunk 10 of the legged robot 100. The X-axis is referred to as the roll axis. The Y-axis extends along the lateral direction of the trunk 10 of the legged robot 100. The Y-axis is referred to as the pitch axis. The Z-axis extends vertically upward from the trunk 10 of the legged robot 100. The Z-axis is referred to as the yaw axis. The roll axis (X-axis), the pitch axis (Y-axis), and the yaw axis (Z-axis) are mutually orthogonal to each other.

Next, the joints will be explained. A joint having a rotation axis in the roll axis direction is referred to as a roll joint. A joint having a rotation axis in the pitch axis direction is referred to as a pitch joint. A joint having a rotation axis in the yaw axis direction is referred to as a yaw joint.

In FIG. 1(A), the circle that is labeled, for example, by reference numeral 38L represents a joint that has a rotation axis in a direction that is perpendicular to the plane of the figure. The point C1 that is drawn at the center of the circle shows the axis of rotation. In FIG. 1(A), the direction that is perpendicular to the plane of the figure is the roll axis (the X-axis) direction, and thus the joint that is labeled by reference numeral 38L represents a roll joint.

In FIG. 1(A), the diamonds that are labeled, for example, by reference numerals 36L and 40L represent joints having a rotation axis within a plane that is parallel to the plane of the figure. The direction that is within the plane of the figure and perpendicular to the straight lines drawn in the diamonds represent the direction of the rotation axis of each joint. For example, the joint labeled by the reference numeral 36L shown in FIG. 1(A) represents the joint that has a rotation axis in the direction of the pitch axis (Y-axis). That is, the joint labeled by the reference numeral 36L shown in FIG. 1(A) represents the pitch joint. The joint labeled by the reference numeral 40L in FIG. 1(A) represents the joint having a rotation axis in the direction of the yaw axis (Z-axis). That is, the joint labeled by the reference numeral 40L in FIG. 1(A) represents the yaw joint.

In FIG. 1(A), which is a front view of the legged robot 100, the roll joint is represented by a circle, as shown by the reference numeral 38L. In FIG. 1(B), which is a side view of the legged robot 100, the roll joint is represented by a diamond that includes a straight line extending in a vertical direction in the figure. In FIG. 1(A), the roll joint labeled by the reference numeral 38L is represented by a circle. In FIG. 1(B), the roll joint labeled by reference numeral 38L is represented by a diamond that includes a straight line extending in a vertical direction in the figure. This is because in FIGS. 1(A) and 1(B), each of the axial directions in the coordinate systems for the figures are different. Similarly, while in FIG. 1(A), the pitch joint 36L is represented by a diamond that includes a straight line in the vertical direction in the figure, it is represented by a circle in FIG. 1(B). The meaning of the shape of the joints shown in the figures is identical to those in the figures which will be described below.

The types of each of the joints of the legs 20L and 20R (in which the type of the joint is one of the roll joint, pitch joint, and yaw joint) are determined by the direction of the rotation axis of the joint while the legged robot 100 holds a stand-straight attitude. A stand-straight attitude denotes a state in which, as shown in FIGS. 1(A) and 1(B), the pair of legs 20L and 20R are maintained in the same attitude and extend straight vertically downward with respect to the trunk 10. In other words, the stand-straight attitude of the legged robot 100 denotes a state that is identical to the state of a human being standing straight. The type of each of the joints is determined in the state in which the legged robot 100 holds the stand-straight attitude. The direction in which the rotation axis of the each joint provided in the legs is directed changes while the links swing. However, the type of each joint that is determined by the state in which the legged robot 100 holds the stand-straight attitude does not change in any manner in accordance with how the attitudes of the legs 20L and 20R change. In addition, a joint is classified as a roll joint in a case where, while the legged robot 100 is holding the stand-straight attitude, the angle between the rotation axis of the joint and the roll axis is smaller than the angle between the rotation axis and the pitch axis and the angle between the rotation axis and the yaw axis. A joint is classified as a pitch joint in a case where, while the legged robot 100 is holding the stand-straight attitude, the angle between the rotation axis of the joint and the pitch axis is smaller than the respective angle of the rotation axis and the roll axis or the yaw axis. A joint may be classified as a yaw joint in a similar manner.

The configuration of the legged robot 100 will be explained. The legged robot 100 includes a trunk 10, a pair of legs 20L and 20R, and a pair of leg connecting portions 18L and 18R. The trunk 10 has a pair of lateral surfaces 12L and 12R, and a bottom surface 14.

The left leg 20 L is connected to the left lateral surface 12L via the left leg connecting portion 18L, which has a rotation axis C0 in the pitch axis direction. The right leg 20R is connected to the right lateral surface 12R via the right leg connecting portion 18R, which has a rotation axis C0 in the pitch axis direction. Each of the legs 20L and 20R can rotate around the pitch axis C0 with respect to the trunk 10 by the leg connecting portions 18L and 18R.

The configuration of the left leg 20L will be explained. The left leg 20L includes a left first link 22L, a left second link 24L, a left third link 26L, a left fourth link 28L, a left fifth link 30L, and a left sixth link 32L. In addition, the left leg 20L includes a left first joint 36L, a left second joint 38L, a left third joint 40L, a left fourth joint 42L, and a left fifth joint 44L.

One end of the left first link 22L is connected to the left leg connecting portion 18L, and the other end thereof is connected to one end of the left second link 24L via the left first joint 36L.

The other end of the left second link 24L is connected to one end of the left third link 26L via the left second joint 38L. The other end of the left third link 26L is connected to one end of the left fourth link 28L via the left third joint 40L. The other end of the left fourth link 28L is connected to one end of the left fifth link 30L via the left fourth joint 42L. The other end of the left fifth link 30L is connected to one end of the left sixth link 32L via the left fifth joint 44L.

The left sixth link 32L corresponds to the foot plate of the left leg 20L. The bottom surface of the left sixth link 32L is brought into contact with the ground 900. The left sixth link 32L may be referred to as a foot plate link.

Actuators (not illustrated) are built into the left leg connecting portion 18L, the left first joint 36L, the left second joint 38L, the left third joint 40L, the left fourth joint 42L, and the left fifth joint 44L. The actuators are structured by a motor and a speed reduction gear-box, and can rotate the links that are adjacent to the joint around the rotation axis of the joint.

The left leg connecting portion 18L can rotate the left first link 22L around the pitch axis. The left first joint 36L and the left fifth joint 44L are pitch joints. The left second joint 38L and the left fourth joint 42L are roll joints. The left third joint 40L is a yaw joint.

The left first link 22L extends along the left lateral surface 12L. The left second link 24L and the left fifth link 30L extend parallel to the bottom surface 14. The left third link 26L and the left fourth link 28L extend in a downward direction under the bottom surface 14.

As shown in FIG. 1(A), the left leg 20L extends along the left lateral surface 12L and curves along the bottom surface 14 at an intermediate point thereof where the leg 20L curves into beneath the body trunk 10, and then curves downward under the trunk 10 due to the left first link 22L, the left second link 24L, and the left third link 26L, when viewed from the roll axis direction (in other words, in the plane parallel to the plane including the yaw axis and the pitch axis).

In addition, as shown in FIG. 1(A), among the joints possessed by the left leg 20L, the roll joints (the left second joint 38L and the left fourth joint 42L) are disposed below the trunk 10 when viewed from the roll axis direction.

In the left leg 20L of the legged robot 100, it is possible to move the left sixth link 32L, which is the foot plate link, at any position and attitude within the movement range thereof by the left leg connecting portion 18L, the five joints (the left first joint 36L, the left second joint 38L, the left third joint 40L, the left fourth joint 42L, and the left fifth joint 44L), and the actuators that are built in the respective joints. Note that singularity points caused from an inverse transformation which derives the rotation angles of the respective joints from the position and the attitude of the left sixth link 32L are excluded.

The right leg 20R has a right first link 22R, a right second link 24R, a right third link 26R, a right fourth link 28R, a right fifth link 30R, and a right sixth link 32R. In addition, the right leg 20R has a right first joint 36R, a right second joint 38R, a right third joint 40R, a right fourth joint 42R, and a right fifth joint 44R. The configuration of the right leg 20R is identical to the configuration of the left leg 20L. Note that the overall shape of the right leg 20R is bilaterally symmetrical to the overall shape of the left leg 20L with respect to a straight line that passes through the center of the trunk 10 and is parallel to the yaw axis when viewed from the roll axis direction.

Reference numerals having the same number are assigned to the parts of the right leg 20R that correspond to each of the parts of the left leg 20L. The letter "L" that is attached to the reference numeral denoting that the part is a part of the left leg 20L, and a letter "R" attached to a reference numeral denoting that the part is a part of the right leg 20R.

The configuration of the right leg 20R is identical to the configuration of the left leg 20L, and thus the detailed explanation of the right leg 20R will be omitted.

The legged robot 100 has a controller (not illustrated) and a power unit (not illustrated). The legged robot can walk due to the controller that outputs appropriate actuation control commands to the left leg connecting portion 18L and the right leg connecting portion 18R, and to the actuators that are built into each of the joints. The explanation of the algorithm for walking will be omitted.

Figure 7:
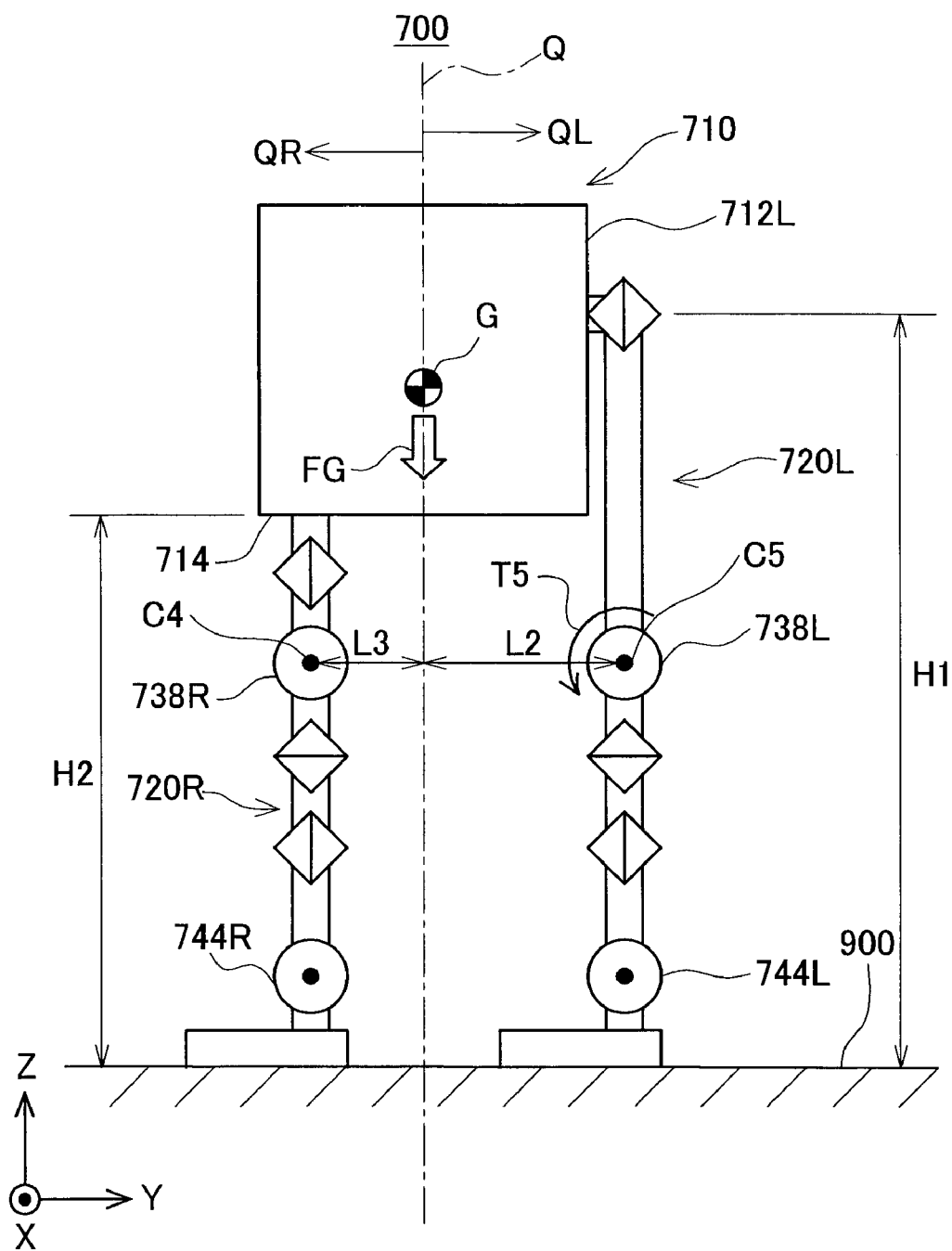
FIG. 7 shows a front view of a conventional legged robot.

As shown in FIG. 1(A), the left leg 20L is connected to the left lateral surface 12L. The right leg 20R is connected to the right lateral surface 12R. As shown in FIG. 1(B), the height H1 from the ground 900 (the height H1 is defined as the length from the ground 900 to the rotation axis C0 of the pair of leg connecting portions 18L and 18R), when the left leg 20L and the right leg 20R are in a stand-straight attitude, can be made taller than the height H2 of the bottom surface 14. As shown on the QR side of FIG. 7, it is possible to make the height of the leg taller than the case in which the leg 720R is connected to the trunk 710 at the bottom surface 714. The left leg 20L and the right leg 20R can respectively rotate around the pitch axis with respect to the trunk 10 on the left lateral surface 12L and the right lateral surface 12R. The legged robot 100 walks by the controller (not illustrated) alternately swinging the left leg 20L and the right leg 20R with respect to the trunk 10. The step length can be made larger as the height of the leg is made taller. By connecting the legs 20L and 20R respectively to the lateral surfaces 12L and 12R of the trunk 10, it is possible to make the step length large while keeping the height of the trunk 10 in the vertical direction at a low position.

Next, the moment acting around the roll axis in the leg that is in contact with the ground when the legged robot 100 stands by one leg will be explained. The case in which the right leg 20R is the free leg and the left leg 20L is in contact with the ground will be explained below. Note that the leg being in contact with the ground is referred to as the "grounding leg". The leg being not in contact with the ground is referred to as the "free leg".

Due to the configuration of the left leg 20L that has been explained above, the roll joints (the left second joint 38L and the left fourth joint 42L) possessed in the left leg 20L are disposed at a part below the trunk 10 when viewed from the rolled axis direction. As shown in FIG. 1(A), the distance, along the pitch axis direction, between the center of mass G of the trunk and the rotation axis C1 of the left second joint 38L is denoted by L1. In contrast, as shown in the QL side of FIG. 7, the leg 720L is connected to the trunk 710 at the lateral surface 712L, and when the leg 720L structured so as to extend downward from the connecting portion with the trunk 710, the distance, along the pitch axis direction, between the roll axis joints 738L and 744L and the center of the mass G of the trunk is denoted by L2. As can be understood by comparing FIG. 7 and FIG. 1(A), because the roll joints (the left second joint 38L and the left fourth joint 42L) possessed by the left leg 20L are disposed below the trunk 10 when viewed from the roll axis direction, even when the left leg 20L is connected to the trunk 10 at the lateral surface 12L, it is possible to suppress an increase in the distance, along the pitch axis direction, between the rotation axis of the roll joint (for example, the rotation axis C1 that is shown in FIG. 1(A)) and the center of mass of the trunk. By suppressing any increase in the distance, along the pitch axis direction, between the rotation axis of the roll joint possessed in the leg and the center of mass G of the trunk, it is possible to suppress increases in the load acted to the roll axis joint. It is possible to suppress the increases in size of the actuators built into the roll axis joints, and thus also the increases in the sizes of the roll axis joints themselves.

The effect of the above will be explained with reference to FIG. 2(A) and FIG. 2(B). FIG. 2(A) is a front view of the legged robot 100 where the right leg 20R is the free leg and the left leg 20L is the grounding leg while the legged robot 100 is walking. FIG. 2(B) is a side view that corresponds to FIG. 2(A). Note that in FIG. 2(B), excluding the right first link 22R, the illustrations of the parts hidden by the parts positioned to the front are omitted. Only the right first link 22R is drawn by a hidden line, and this is to facilitate understanding the side-view shape of the right leg 20R overall.

The attitude of the legged robot 100 shown in FIG. 2(A) and FIG. 2(B) is realized by the controller (not illustrated) of the legged robot 100 appropriately controlling the rotation angle of each of the joints. In a case where the right leg 20R is the free leg, the mass of the trunk 10 and the right leg 20R must be supported against gravitational force by only the left leg 20L. In order to simplify the explanation, the position of the center of mass, which is a combination of the trunk 10 and the right leg 20R, is approximated by using the position of the center of mass G of the trunk. The force by gravity acting on the mass that is a combination of the trunk 10 and the right leg 20R is denoted FG Below, this force is referred to as the gravitational force FG The gravitational force FG is a force that acts on the center of mass G of the trunk, and is a force that acts vertically downward from the center of mass G of the trunk. A moment that is proportional to the distance in the pitch axis direction between the positions of each of the parts and the center of mass G of the trunk acts on each of the parts of the left leg 20L, which is the grounding leg, due to the gravitational force FG. This moment acts around the roll axis. The roll joint must maintain the rotation angle around the roll axis of the link that is connected to this roll joint by the output torque of the actuator that is built into the roll joint. Therefore, when the moment around the roll axis due to the gravitational force FG becomes large, the torque that should be output by the actuator (not illustrated) installed in the roll joint must also be increased. Among the joints possessed by the left leg 20L, when the left second joint 38L, which is one of the roll joints, is used as an example, a moment T1, which may be represented as below, acts on the rotation axis C1 of the left second joint 38L:

[gravitational force FG]×[moment arm L1]

The actuator built into the left second joint 38L must output a torque equivalent to one that resists this moment T1. When the moment arm L1 increases, the moment T1 that acts on the rotation axis C1 also increases. The load acted on the actuator built into the left second joint 38L increases. The actuator, and thus the left second joint 38L itself, become large. This case is equivalent to the case in which only the right leg 20R is the grounding leg, and thus, similar to the left second joint 38L, the right second joint 38R also becomes large. As a result, the gravitational force FG becomes large, and furthermore, the moment T1 that acts on the rotation axis C1 of the left second joint 38L increases. The same condition applies to the left fourth joint 42L, which is another roll joint.

In addition, in the above explanation, the position of the center of mass including trunk 10 and the right leg 20R, is approximated to the center of mass G of the trunk. The above explanation also applies to the exact position of the center of mass including the trunk 10 and the right leg 20R.

In the legged robot 100 of the present embodiment, it is possible to suppress the increase in the distance, along the pitch axis direction, between the rotation axis of the roll joint (for example, the rotation axis C1 that is shown in FIG. 1(A)) and the center of mass G of the trunk even when the left leg 20L is connected to the trunk 10 at the lateral surface 12L with the roll joints (the left second joint 38L and the left fourth joint 42L) that are possessed by the left leg 20L being disposed at a part of the left leg 20L below the trunk 10 when viewed from the roll axis direction.

While the leg is connected to the trunk at a lateral surface, an increase in the distance, along the pitch axis direction, between the rotation axis of the roll joint possessed by the leg and the center of mass G of the trunk is limited, and thus, it is possible to prevent the roll joints from becoming large. By linking the leg to the trunk at a lateral surface, it is possible to realize a legged robot that can ensure a large step length while keeping the height of the trunk at a relatively low position, and that prevents the roll joints of a leg from being large-sized.

In addition, as shown in FIG. 1(B), in the legged robot 100 in the present embodiment, the leg connecting portions 18L and 18R between the trunk 10 and the legs 20L and 20R are disposed on the lateral surfaces 12L and 12R such that the rotation centers C0 thereof are positioned vertically above the position of the center of mass G of the trunk. Here, the expression "the rotation axis C0 is positioned vertically above the position of the center of mass G of the trunk" is not limited to the case in which the positions of the rotation axis C0 and the center of mass G of the trunk are arranged on a vertical line. The rotation axis C0 may be positioned at the upper side than a horizontal plane that passes through the center of mass G of the trunk. In this sense, the expression "the rotation axis C0 is positioned vertically above the position of the center of mass G of the trunk" in the present embodiment may also simply be expressed by "the rotation axis C0 is positioned above the position of the center of mass G of the trunk", and thereby has the same meaning.

It is possible to put the attitude of the trunk 10 around the rotation axis C0 of the leg connecting portions 18L and 18R to an autonomous stabilizing state (self-stabilizing state) by disposing the leg connecting portions 18L and 18R as described above. Specifically, for the leg connecting portions 18L and 18R, even if the trunk 10 and the legs 20L and 20R are set to a freely rotating state, the gravitational force acts such that the center of mass G of the trunk is positioned vertically below the rotation axis C0 of the leg connecting portions 18L and 18R. Even if the trunk 10 and the legs 20L and 20R are set in a freely rotating state, the trunk 10 does not overturn. It is possible to improve the stability of the attitude of the trunk 10 around the rotation axis C0 of the leg connecting portions 18L and 18R.

Second Embodiment

Figure 3:
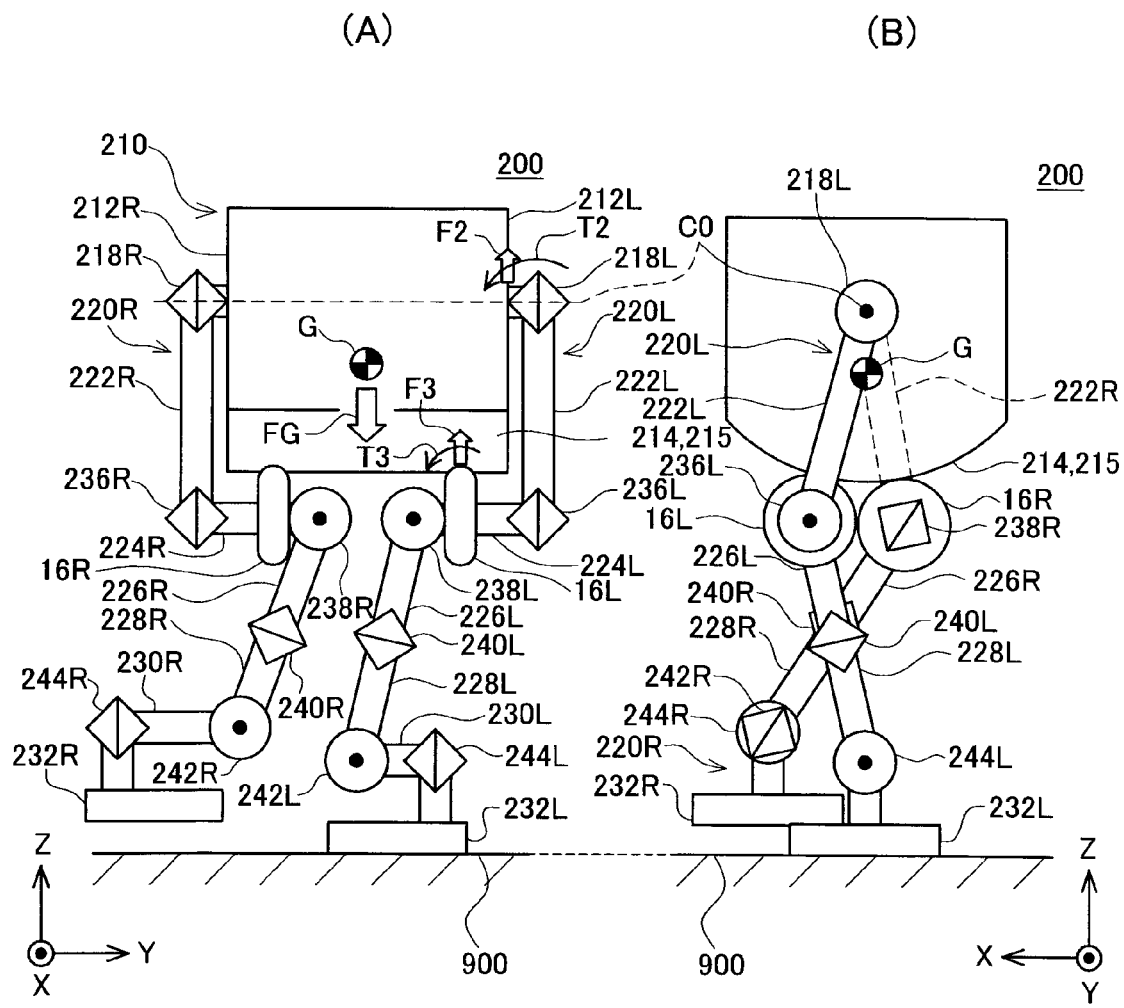
FIG. 3(A) shows a front view and FIG. 3(B) shows a side view of a legged robot of a second embodiment at a state in which the legged robot is standing on one leg.

Next, the second embodiment will be explained with reference to FIGS. 3(A) and 3(B). A legged robot 200 according to the second embodiment has a trunk 210 and a pair of legs 220L and 220R. FIG. 3(A) is a front view of the legged robot 200 in a state in which the right leg 220R is the free leg and the left leg 220L is the grounding leg. FIG. 3(B) is a side view that corresponds to FIG. 3(A). In FIG. 3(B), except for a right first link 222R, the illustrations of the parts hidden by the parts that are positioned to the front of the figure are omitted.

The differences between the legged robot 200 and the legged robot 100 shown in FIG. 1(A) are the shape of a bottom surface 214 of the legged robot 200 and that the legs 220L and 220R of the legged robot 200 each have rollers 16L and 16R. The other aspects are identical to those of the legged robot 100 shown in FIG. 1(A), and thus the detailed explanation thereof has been omitted. Note that except for the numbers in the third digit, the same numbers are appended to the parts of the legged robot 200 that correspond to each of the parts of the legged robot 100 shown in FIG. 1(A).

As shown in FIG. 3(B), a curved surface portion 215 (the curved bottom surface) that is formed into an arc that is centered on a rotation axis C0 of leg connecting portions 218L and 218R that connect the trunk 210 and the legs 220L and 220R is formed on the bottom surface 214 of the legged robot 200 in a plane parallel to the plane including the yaw axis (the Z-axis) and the roll axis (the X-axis). Note that in the present embodiment, the curved surface portion 215 is formed over the entire bottom surface 214. Therefore, in FIGS. 3(A) and 3(B), the portion that is identical to the bottom surface 214 is shown as the curved surface portion 215. Here, the expression "in the plane parallel to the plane including the yaw axis and the roll axis" is equivalent to the expression "when viewed from the pitch axis direction".

A left first link 222L of the left leg 220L can rotate around the rotation axis C0 due to the left leg connecting portion 218L. Thus, the other end of the left first link 222L can move along the bottom surface 214. A left second link 224L is connected to the left first link 222L via a left first joint 236L.

The left second link 224L also extends along the bottom surface 214 in the pitch axis direction. The left first joint 236L that connects the left first link 222L and the left second link 224L is a pitch joint that causes the left second link 224L to rotate around the pitch axis. Thereby, no matter how the left first link 222L and the left second link 224L are rotated, the left second link 224L moves along the curved surface portion 215 that is formed on the bottom surface 214 while always maintaining a state in which it extends along the pitch axis. A left roller 16L that can freely rotate is provided on the left second link 224L. An outer circumferential surface of the left roller 16L is in contact with the curved surface portion 215. The left second link 224L is always extended along the pitch axis, and moves along the curved surface portion 215, and thus the contact between the left roller 16L and the bottom surface 214 is always maintained. In addition, the left roller 16L is disposed so as to be able to rotate with respect to the left second link 224L. When the left second link 224L moves along the bottom surface 214, the left roller 16L moves with respect to the curved surface portion 215 that is formed on the bottom surface 214. The left second link 224L can move smoothly along the bottom surface 214 while maintaining the contact between the left roller 16L and the curved surface portion 215. Specifically, the left leg 20L rotates with the pivot at the rotation axis C0 of the left leg connecting portion 218L, and accompanying this rotation, the left roller 16L disposed on the left second link 224L rotates while maintaining the contact with the curved surface portion 215.

The attitude of the legged robot 200 shown in FIGS. 3(A) and 3(B) is identical to the attitude of the legged robot 100 that is shown in FIGS. 2(A) and 2(B). Here, assumptions that are identical to those that have been made in FIG. 2(A) and FIG. 2(B) may also be made. Specifically, the position of the center of mass of a combination of the trunk 210 and the right leg 220R is approximated to the center of mass G of the trunk. The gravitational force acting on the mass of the combination of the trunk 210 and the right leg 220R is denoted FG. Below, this force is referred to as the gravitational force FG. The gravitational force FG is a force that acts vertically downward on the center of mass G of the trunk.

In a case where only the left leg 220L is the grounding leg, the gravitational force FG must be supported only by the left leg 220L. In the legged robot 100 shown in FIGS. 2(A) and 2(B), the gravitational force FG acts on the connecting portion between the trunk 10 and the left leg 20L. In the legged robot 200 of the present embodiment, the gravitational force FG can be supported at two points: the connecting portion between the trunk 210 and the left leg 220L, and the contact point between the trunk 210 and the left roller 16L. Specifically, as shown in FIGS. 3(A) and 3(B), the gravitational force FG balances with the combined force of the resistance force F2 that is generated by the left leg 220L at the connecting portion between the trunk 210 and the left leg 220L and the resistance force F3 that is generated by the left leg 220 at the contact point between the trunk 210 and the left roller 16L. Due to the resistance forces F2 and F3 being balanced with the gravitational force FG, it is possible to make the resistance force F2 that is generated by the left leg 220L at the connecting portion between the trunk 210 and the left leg 220L smaller than the case of the legged robot 100 shown in FIGS. 2(A) and 2(B). This also means that the moment acting on the left leg 220L around the pitch axis due to the gravitational force FG is divided into the moment T2 acting on the connecting portion between the trunk 210 and the left leg 220L and the moment T3 acting on the contact point between the trunk 210 and the left roller 16L. Therefore, when only the left leg 220L serves as the grounding leg, it is possible to reduce the load and the moment applied to the connecting portion between the trunk 210 and the left leg 220L. It is possible to reduce the rigidity of the connecting portion between the trunk 210 and the left leg 220L. If the rigidity thereof can be reduced, then it is possible to reduce the weight of the connecting portion. The above explanation is similar to the case in which only the right leg 220R serves as the grounding leg. In addition, the above explanation applies even if the position of the center of mass including the free leg and the trunk is not approximated by the center of mass of the trunk.

The bottom surface 214 of the legged robot 200 includes the curved surface portion 215 that is formed in an arc shape with a pivot at the rotation axis C0 of the leg connecting portions 218L and 218R, which connect the trunk 210 and the legs 220L and 220R. It is possible to make the load and the moment acting on the leg connecting portion of the loaded leg while standing on one leg to be small, with the configuration of the legs 220L and 220R having the rollers 16L and 16R, respectively, that are in contact with the curved surface portion 215. It is possible to make the rigidity of the leg connecting portions 218L and 218R low. If the rigidity can be made low, then it is possible to make the leg connecting portions 218L and 218R to weigh lighter.

Not only is it possible to limit the increase in the moment that is generated by the gravitational force that acts on the trunk and acting on the roll joint of the grounding leg while standing on one leg, but it is further possible to realize a legged robot that can reduce the load and moment acting on the connecting portion between the trunk and the leg at the lateral surface of the leg on the grounding leg side, and can ensure a large step length while keeping the height of the trunk at a low position.

Note that the curved surface portion 215 may be formed on the bottom surface 214 at least at the part on which the rollers 16L and 16R move. In other words, the arc-shaped curved surface portion 215, whose cross-section intersects with the pitch axis is centered on the rotation axis C0 of the leg connecting portions, may be formed on at least a portion of the lower surface 214 of the trunk 210.

Third Embodiment

Figure 4:
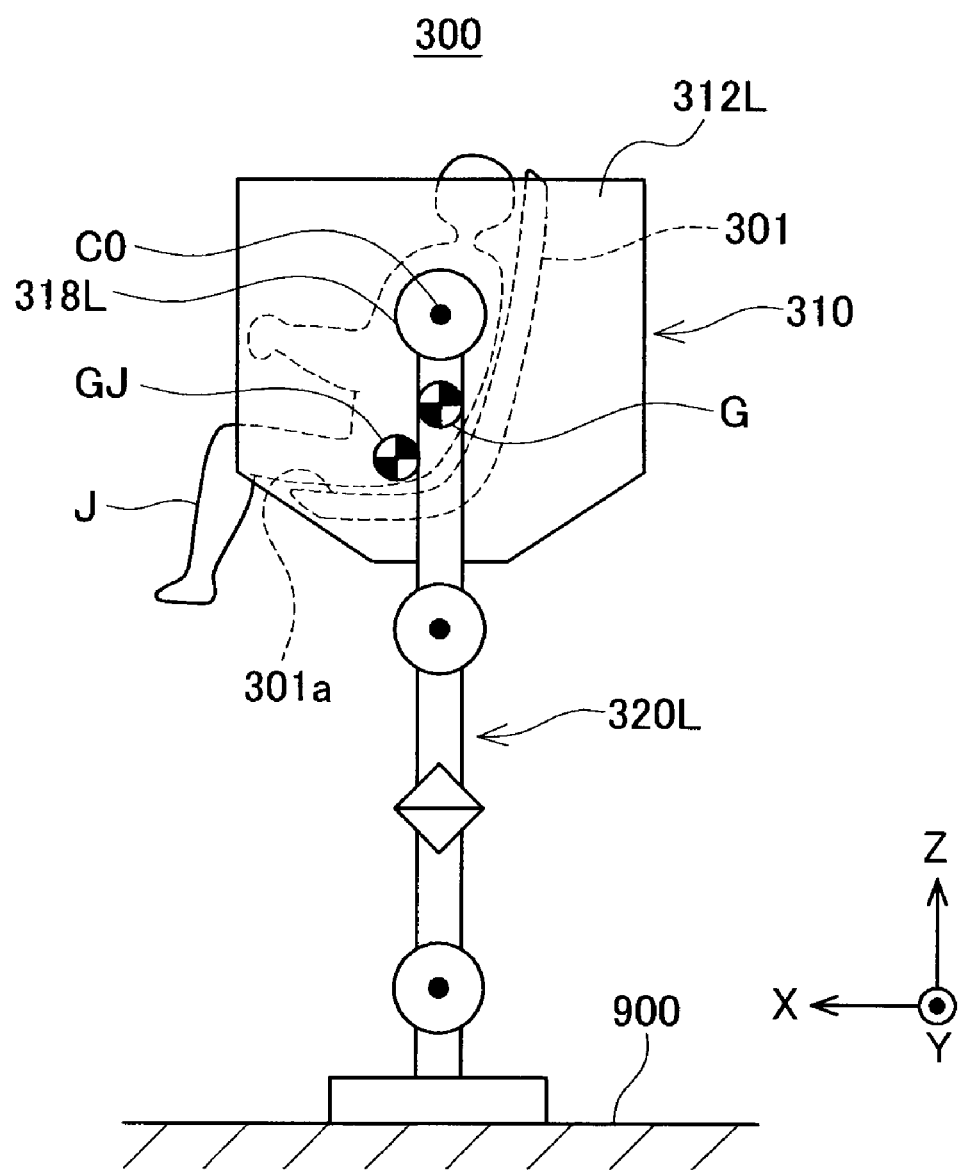
FIG. 4 shows a side view of the legged robot of a third embodiment.

Next, a third embodiment will be explained with reference to FIG. 4. FIG. 4 is a side view of a legged robot 300 according to the third embodiment. The legged robot 300 has a trunk 310, a pair of legs 320L and 320R, and a pair of leg connecting portions 318L and 318R. The explanation of the pair of legs 320L and 320R will be omitted because they are identical to the pair of legs 20L and 20R that are provided on the legged robot 100 of the first embodiment. The pair of legs 320L and 320R may be identical to the pair of legs 220L and 220R that are provided on the legged robot 200 of the second embodiment. The explanation of the pair of leg connecting portions 318L and 318R is omitted because they are identical to the pair of leg connecting portions 18L and 18R that are provided on the legged robot 100 of the first embodiment.

In the side view of FIG. 4, with respect to the pair of legs 320L and 320R, the illustration of the parts that cannot be seen due to parts that are positioned in front to the figure are omitted. Therefore, the right leg 320R overall and the right leg connecting portion 318R is not illustrated in FIG. 4.

As shown in FIG. 4, the left leg connecting portion 318L of the legged robot 300 is disposed at the left lateral surface 312L such that the rotation axis C0 thereof is positioned vertically above the position of the center of mass G of the trunk. Here, the expression "the rotation axis C0 is positioned vertically above the position of the center of mass G of the trunk" is not limited to the case in which the positions of the rotation axis C0 and the center of mass G of the trunk are aligned on a vertical line. The rotation axis C0 may be positioned above the horizontal plane that passes through the center of mass G of the trunk. In this sense, the expression "vertically above" in the present embodiment means the same as the simple expression "above". Note that the rotation axis C0 is also the rotation axis of the right leg connecting portion 318R that is not shown in FIG. 4. Specifically, the right leg connecting portion 318R of the legged robot 300 is disposed on a right lateral surface 312R such that the rotation axis C0 thereof is positioned vertically above the position of the center of mass G of the trunk.

The legged robot 300 shown in FIG. 4 has a seat 301 on which a rider J is seated inside the trunk 310. Specifically, this legged robot 300 is a legged robot for riding, which walks while a rider is riding.

A seat base 301a of the seat 301 is disposed below the rotation axis C0 of the leg connecting portions 318L and 318R. Generally, it is known that the position of the center of mass when a person is seated is in the vicinity of the hip. In FIG. 4, the symbol GJ denotes the center of mass of the rider J who is seated in the seat 301. It is possible to set the position of the center of mass GJ of the rider J vertically below the rotation axis C0 by disposing the seat 301 such that the seat base 301a thereof positions so as to be vertically below the rotation axis C0. The expression "vertically below" does not denote only the case in which the positions of the rotation axis C0 and the center of mass GJ of the rider J are aligned on a vertical line. This expression also denotes the case in which the position of the center of mass GJ is more toward the vertically lower side than the horizontal plane that passes through which the rotation axis C0 passes. In this sense, the expression "vertically below" simply means the same as the expression "below".

The position of the center of mass, which is a combination of the center of mass G of the trunk 310 and the center of mass GJ of the rider J, can be positioned vertically below the rotation axis C0 with the position of the center of mass GJ of the rider J being set vertically below the rotation axis C0. Therefore, similar to the first embodiment, it is possible to set the attitude of the trunk 310 around the pitch axis around the rotation axis C0 of the leg connecting portions 318L and 318R to an autonomous stabilizing state (self-stabilizing state). Specifically, with respect to the leg connecting portions 318L and 318R, even when the trunk 310 and the legs 320L and 320R are set to a freely rotating state, the gravitational force acts such that the position of the center of mass that combines the trunk 310 and the rider J is positioned vertically below the rotation axis C0. Even if the trunk 310 and the legs 320L and 320R are set to a freely rotating state, the trunk 310 does not overturn. It is possible to improve the stability around the rotation axis C0 of the attitude of the trunk 310 in which the rider J is mounted.

Fourth Embodiment

Figure 5:
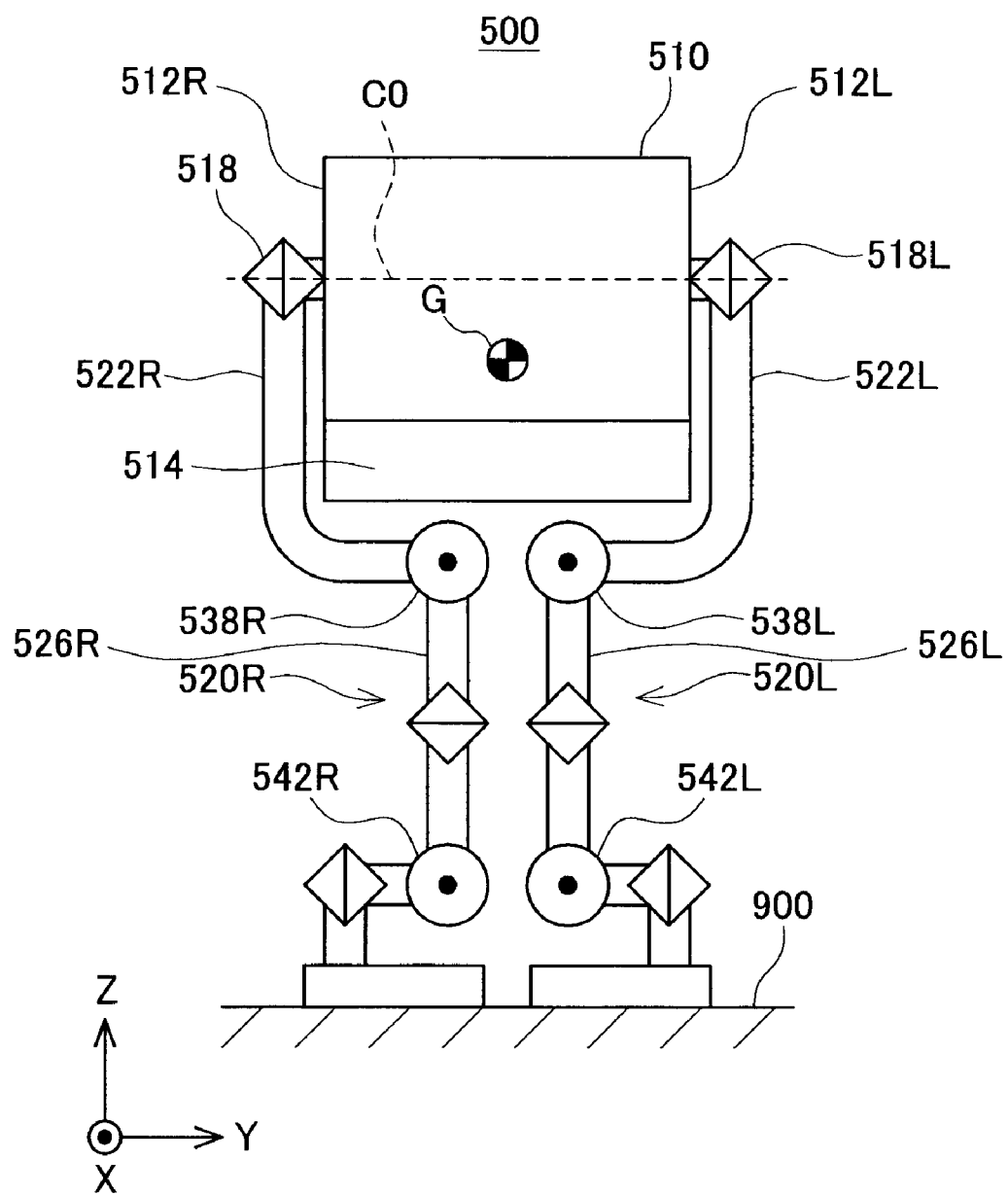
FIG. 5 shows a front view of a legged robot of a fourth embodiment.

Next, a fourth embodiment will be explained. FIG. 5 is a front view of a legged robot 500 according to the fourth embodiment. The XYZ coordinate system shown in FIG. 5 has the same significance as the XYZ coordinate system shown in FIG. 1(A). The legged robot 500 has a trunk 510 and a pair of legs 520L and 520R. The left leg 520L is connected to the left lateral surface 512L of the trunk 510 via the left leg connecting portion 518L. The left leg connecting portion 518L has a rotation axis in the pitch axis direction, and the left leg 520L can be rotated around the rotation axis thereof. The right leg 520R is connected to the right lateral surface 512R of the trunk 510 via the right leg connecting portion 518R. The right leg connecting portion 518R has a rotation axis in the pitch axis direction, and the right leg 520R can rotate around the rotation axis thereof. In addition, the leg connecting portions 518L and 518R are disposed on the lateral surfaces 512L and 512R such that the rotation axis C0 thereof is positioned vertically above the center of mass G of the trunk.

The left leg 520L includes a left first link 522L (a left curved link 522L). One end of the left first link 522L is connected to the left leg connecting portion 518L, and extends along the left lateral surface 512L. At an intermediate point of the left first link 522L in the lengthwise direction, the left first link 522L curves along the corner edge between the lateral surface 512L and a bottom surface 514. The other end of the left first link 522L is vertically below the bottom surface 514 and connected to a left third link 526L (a lower link) via a left second joint 538L. The left third link 526L extends vertically downward from the left second joint 538L below the bottom surface 514. The explanation of the structure from the left third link 526L to the end of the leg will be omitted because the structure is identical to that of the legged robot 100 that is shown in FIG. 1(A).

The left leg 520L of the legged robot 500 includes the left second joint 528L and a left fourth joint 542L, which are roll axis joints. The left leg 520L additionally includes the left first link 522L (the left curved link) that extends along the left lateral surface 512L and curves toward the direction of the bottom surface 514 at an intermediate point. The legged robot 500 is configured such that the left second joint 538L and the left fourth joint 542L, which are roll axis joints, are positioned vertically below the bottom surface 514 when viewed from the roll axis direction due to the left first link 522L that curves at an intermediate point. The structure of the right leg 520R is identical to that of the left leg 520L, and thus the explanation thereof is omitted.

In the legged robot 500 as well, as shown in FIG. 5, when viewed from the roll axis direction, the left leg 520L is formed, due to the left first link 522L and the left third link 526L, so as to extend along the left lateral surface 512L, to gradually curve so as to extend along the bottom surface 514 at an intermediate point, and then to curve vertically downward below the trunk 510.

In addition, as shown in FIG. 5, among the joints possessed by the left leg 520L, the roll joints (the left second joint 538L and the left fourth joint 542L) are disposed at a part that is positioned, when viewed from the roll axis direction, vertically below the trunk 510. Therefore, the legged robot 500 also possesses features that are identical to those of the legged robot 100 shown in FIG. 1(A), and it is possible to obtain effects that are identical to those of the legged robot 100.

As can be understood when comparing FIG. 1(A) and FIG. 5, the legged robot 500 shown in FIG. 5 does not include the first joints 36L and 36R, which are included in the legged robot 100 shown in FIG. 1. Specifically, each of the legs 520L and 520R of the legged robot 500 have a number of degree of freedom that is one degree of freedom less than each of the legs 20L and 20R of the legged robot 100 shown in FIG. 1(A). According to the algorithm that causes the legged robot to walk, there are cases in which the degree of freedom that is possessed by the legs may be less than six degrees of freedom. In such a case as well, the legged robot 500 can obtain effects that are identical to those of the legged robot 100 shown in FIG. 1(A).

Note that in the present embodiment, the left first link 522L and the right first link 522R, which have a shape that curves at an intermediate point, correspond to one embodiment of a "curved link" in the claims.

Fifth Embodiment

Figure 6:
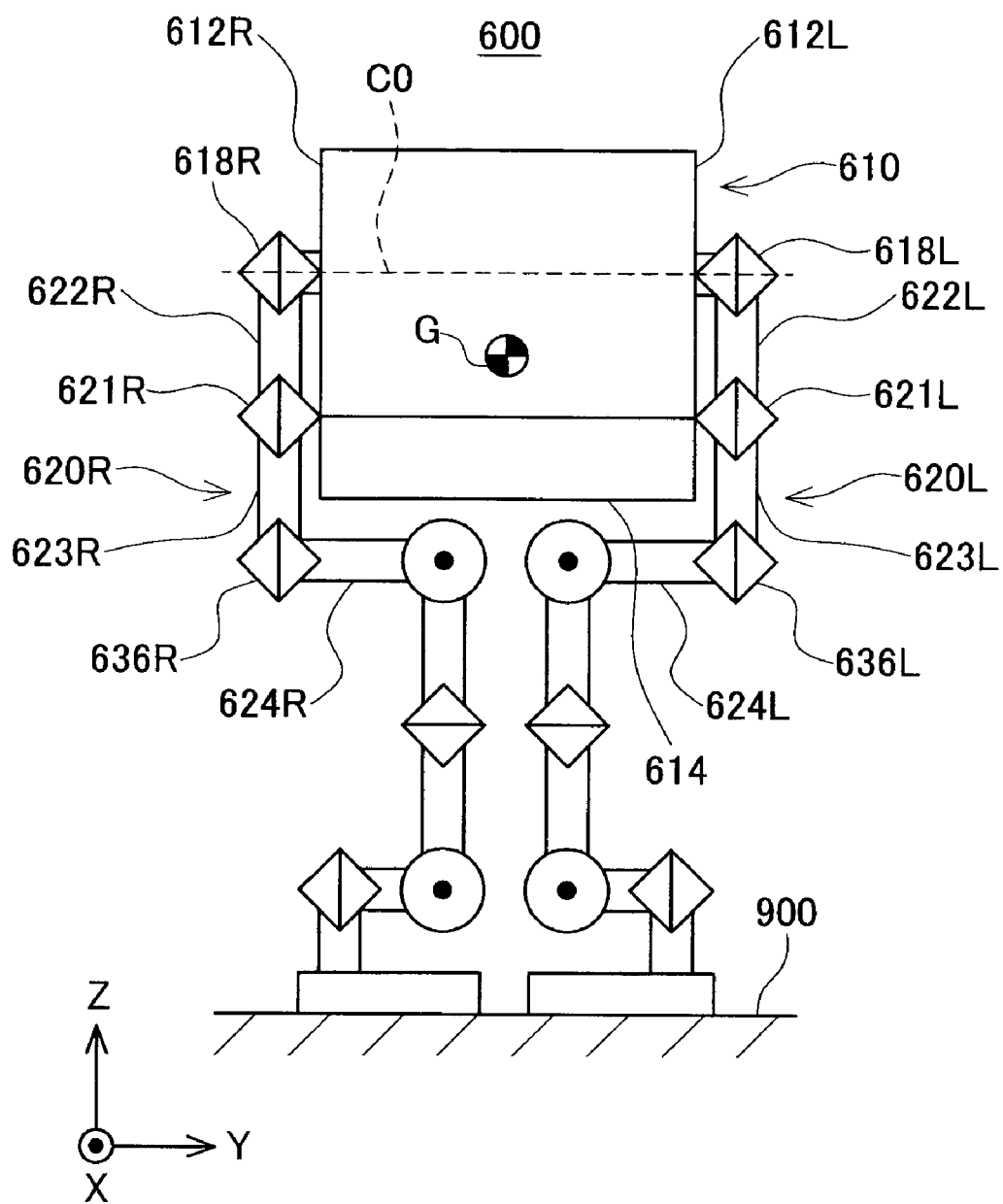
FIG. 6 shows a front view of a legged robot of a fifth embodiment.

A fifth embodiment will be explained with reference to FIG. 6. FIG. 6 is a front view of a legged robot 600 according to the fifth embodiment. The XYZ coordinate shown in FIG. 5 has the same significance as the XYZ coordinate system shown in FIG. 1(A). When compared to the legged robot 100 shown in FIG. 1(A), the legged robot 600 differs on the point that sixth joints 621L and 621R are provided.

The left leg 620L of the legged robot 600 will be explained. One end of a left first link 622L that is possessed by the left leg 620L is connected to a trunk 610 via a left leg connecting portion 618L so as to be able to rotate. The left first link 622L extends along a left lateral surface 612L. The other end of the left first link 622L is connected to one end of a left seventh link 623L via the sixth joint 621L so as to be able to rotate. The other end of the left seventh link 623L is connected to one end of a left second link 624L via a left first joint 636L so as to be able to rotate. The left second link 624L extends along a bottom surface 614. The shape from the left second link 624L to the distal end of the leg 620L is identical to that shown in FIG. 1, and thus the explanation thereof is omitted. In addition, the structure of the right leg 620R is identical to the structure of the left leg 620L, and thus the explanation thereof is omitted.

The connecting structure between the links and the joints in the legs 620L and 620R of the legged robot 600 differs from the connecting structure of the links and joints in the legs 20L and 20R of the legged robot 100 that is shown in FIG. 1(A). However, as shown in FIG. 6, when viewed from the roll axis direction, the legs 620L and 620R of the legged robot 600 are shaped so as to extend along the respective lateral surfaces 612L and 612R from the respective leg connecting portions 618L and 618R, curve to extend along the bottom surface 614 at an intermediate point, and then again curve vertically downward below the trunk. In addition, among the joints that are possessed by the legs 620L and 620R, the roll joints (the joints that are represented by the circle in FIG. 5) are disposed at a part that is positioned vertically below the trunk 610 when viewed from the roll axis direction.

Specifically, when viewed from the roll axis direction, various configurations can be considered for the connecting structure between the links and the joints in order to obtain a shape in which each of the legs extends from the leg connecting portion along the lateral surface, curves to extend along the bottom surface at an intermediate point, and then extends downward below the trunk. Provided that the overall shape of the legs is that of the shape described above, and among the joints that are possessed by the legs, the roll joint is a part of the leg and when viewed from the roll axis side, and the roll joint is positioned at a part that is positioned vertically below the trunk, it is possible to obtain effects that are identical to those of the legged robot 100 of the first embodiment, irrespective of the kinds of connecting structure between the links and the joints that structure the legs.

In addition, each of the legs 620L and 620R of the legged robot 600 has one more joint than the legs 20L and 20R of the legged robot 100 shown in FIG. 1(A), which means that, there is one more degree of freedom. Due to the algorithm that makes the legged robot walk, the degree of freedom that is possessed by the legs may be greater than six degrees of freedom. In such a case as well, provided that the legged robot 600 has the features described above, it is possible to obtain effects that are identical to those of the legged robot 100 shown in FIG. 1(A).

The specific embodiment of the present invention is described above, but these merely illustrate some embodiments of the invention and do not restrict the claims thereof. The art set forth in the claims includes various transformations and modifications to the specific embodiments as set forth above.

For example, all of the legged robots that have been illustrated in the embodiments have only one pair of legs. The legged robot may have a plurality of pairs of legs. In addition, providing the legged robot 500 shown in FIG. 5 with the rollers 16L and 16R that are shown in FIGS. 3(A) and 3(B) is also advantageous. In this case, an arc-shaped curved surface portion in which the cross-section that intersects the pitch axis is centered on the rotation axis C0 is formed on the bottom surface 514 of the legged robot 500. In the links 522L and 522R, the rollers 16L and 16R shown in FIGS. 3(A) and 3(B) may be respectively provided at a part that extends along the bottom surface 514 and corresponds to the curved surface portion. According to such a structure, it is possible to obtain effects that are identical to those of the legged robot 200 shown in the second embodiment.

The technical elements disclosed in the present specification or figures may be utilized separately or in all types of conjunctions and are not limited to the conjunctions set forth in the claims at the time of filing of the application. Furthermore, the art disclosed in the present specification or figures may be utilized to simultaneously realize a plurality of aims or to realize one of these aims.

What is claimed is:

1. A legged robot comprising a body trunk and a pair of legs, wherein:
    each of the legs is connected to each of lateral surfaces of the body trunk via a pitch joint with a rotation axis extending along a pitch direction;
    each of the legs extends along the lateral surface of the body trunk and curves to extend under the body trunk;
    each of the legs has a roll joint with a rotation axis extending along a roll direction; and
    when the legged robot holds a stand-straight attitude, the roll joints are disposed below the body trunk, and are disposed completely between the pitch joints in the pitch direction.

2. The legged robot as in claim 1, wherein each of the legs comprises:
    a first link extending along the lateral surface of the body trunk wherein one end of the first link is connected to the lateral surface of the body trunk;
    a second link extending along a bottom surface of the body trunk wherein one end of the second link is connected to the other end of the first link with a pitch joint; and
    a third link extending downward wherein one end of the third link is connected to the other end of the second link with the roll joint.

3. The legged robot as in claim 1, wherein each of the legs comprises:
    a curved link extending along the lateral surface of the body trunk and curving to extend under the body trunk wherein one end of the curved link is connected to the lateral surface of the body trunk; and
    a lower link extending downward wherein one end of the lower link is connected to the other end of the curved link with the roll joint.

4. The legged robot as in claim 2, wherein:
the body trunk has a curved bottom surface; and
the second link has a roller and moves along the curved bottom surface while the roller is in contact with the bottom surface as the legs rotate with respect to the body trunk.

5. The legged robot as in claim 3, wherein:
the body trunk has a curved bottom surface; and
the curved link has a roller and moves along the curved bottom surface while the roller is in contact with the bottom surface as the legs rotate with respect to the body trunk.

6. The legged robot as in claim 1, wherein each of the legs is connected to the body trunk above the center of mass of the body trunk.

7. The legged robot as in claim 1 comprising a seat in the body trunk wherein a seat base of the seat is positioned below a connection between the body trunk and the legs.

* * * * *